United States Patent [19]

Wynn

[11] Patent Number: 5,777,477
[45] Date of Patent: Jul. 7, 1998

[54] METHOD OF MAGNETIC SOURCE LOCALIZATION USING GRADIENT TENSOR COMPONENTS AND RATE TENSOR COMPONENTS

[75] Inventor: William M. Wynn, Panama City, Fla.

[73] Assignee: The United States of America as represented by the Secretary of the Navy, Washington, D.C.

[21] Appl. No.: 668,453

[22] Filed: Jun. 3, 1996

[51] Int. Cl.$^6$ .............................. G01V 3/40; G01V 3/165
[52] U.S. Cl. .............................................. 342/345; 324/326
[58] Field of Search .................................... 324/244, 260, 324/207.11, 207.22, 326, 331, 345

[56] References Cited

U.S. PATENT DOCUMENTS 4,309,659  1/1902  Yashii ............................ 324/331

Primary Examiner—Walter E. Snow
Attorney, Agent, or Firm—Harvey A. Gilbert

[57] ABSTRACT

Method and apparatus for localization and characterization of a magnetic source including source strength and orientation. Samples of five tensor gradiometer signals from a straight-line track are used to construct a polynominial fit to each gradient tensor component with the variable being either time or track distance. Polynomial expressions are used to estimate rate of change of each gradient tensor component at the current sample, providing five numbers. Current samples of the gradient tensor components form a second five number set. An invention inversion process produces solutions for instantaneous bearing vector from the gradiometer to the source, direction in space of the source magnetic moment vector, and ratio of the magnetic moment vector magnitude to the fifth power of range from gradiometer to source from the gradient tensor component rate samples. The process produces one to four solutions for the indicated source parameters, with an additional one to four solutions obtained by reflection of the bearing vector through an origin located at the gradiometer, with the associated moment vector directions remaining unchanged. Solutions resulting are applied to magnetic source localization. Gradient tensor information is independently processed using the Frahm-Wynn inversion algorithm, to produce multiple solutions for bearing vector, direction of the magnetic moment vector, and ratio of the moment vector magnitude to the fourth power of the range. The two solution sets are merged, producing a unique solution for source position vector and magnetic moment vector for each successive location of the tensor gradiometer.

5 Claims, 7 Drawing Sheets

METHOD OF MAGNETIC SOURCE LOCALIZATION USING GRADIENT TENSOR COMPONENTS AND RATE TENSOR COMPONENTS

INTRODUCTION

This invention relates to magnetic source characterization, and, more particularly, to an apparatus and method for determining the precise localization of an isolated magnetic source along with the determination of source strength and orientation.

BACKGROUND

The location of magnetic objects is central to many defense applications, including submarine and mine detection and localization, as well as civilian applications such as UneXploded Ordnance (UXO) detection and removal, location of buried toxic waste sites, location of buried test nuclear reactors, and location of both land-based and sea-bottom archaeological sites.

The use of magnetic sensors for magnetic object location has a long history. The most commonly-used sensor is a so-called total-field sensor which measures the magnitude of the magnetic field at each site. In practice, the earth's background magnetic field is so large compared to the anomalous magnetic field of the object being sought that the total field sensor actually only measures the projection of the anomalous magnetic field onto the Earth's magnetic field direction. This type of sensor is typically used to produce multiple traces of the total magnetic field along parallel traverses, with subsequent interpretation of source location by means of field contour plots. This procedure requires large data sets which can be very difficult to obtain in regions of uneven terrain, and the position of the source is only crudely obtained, typically with no knowledge of burial depth, source strength, or source orientation.

It is well known that isolated magnetic sources have magnetic fields that, at distances of two or more source dimensions, appear to arise from a point magnetic dipole. The magnetic field of a point magnetic dipole can be completely characterized by two vector quantities, each having three independent components: the position vector of the field point relative to the dipole, and the magnetic moment vector of the dipole, which embodies both the strength of the dipole source and its orientation in space. Any method which could be used to explicitly determine these two vectors would provide essentially complete information about a magnetic source. This information could be used to determine the magnetic "size" of the object, the rough shape of the object, and the precise position of the object for potential recovery or mapping purposes.

In the early 1970's, the U.S. Navy embarked on a program to develop portable tensor magnetic gradiometers. The magnetic field is a vector quantity with three independent orthogonal components. Each of these components has three spatial rates of change, or gradients. Thus it is possible to associate nine gradients with the magnetic field at each spatial point. Mathematically, these nine quantities form a second-rank tensor which may be represented as a 3×3 matrix of numbers, thus the name tensor gradiometer. Physical restrictions on the tensor imposed by Maxwell's equations for the electromagnetic field require that the matrix be symmetric across the diagonal, and that the sum of the diagonal elements be zero. Consequently, there are five independent gradients of the magnetic field at each spatial point.

It has been shown that, within the context of a point dipole representation of a magnetic source, that the five independent gradients of the magnetic field at a single point can be used to determine (1) a unit vector giving the direction to the source, also called the source bearing vector; (2) a unit vector in the direction of orientation of the source dipole; and (3) the ratio of the source dipole strength to the fourth power of the range to the source dipole, also called the scaled moment vector magnitude. (Wynn, "Dipole Tracking with a Gradiometer", in *Naval Ship Research and Development Laboratory Report NSRDL/PC* 3493, Panama City, Fla., January 1972). Wynn demonstrated by numerical methods that there were four solutions for bearing vector and scaled moment vector, with one being the physical solution, the second being called the ghost solution, and two additional solutions being obtained by reflection of the physical and ghost solutions through an origin centered on the measurement point. Wynn further showed that if the magnetic field vector is also measured at the same point that the gradient tensor is measured, then all solutions but the physical solution are rejected, and the range to the source dipole is also determined, resulting in a unique solution for the magnetic dipole moment vector and position vector. The range and moment magnitude determination comes about due to the fact that the magnetic field vector depends on the ratio of the moment vector magnitude to the third power of the range to the source (The gradient tensor inversion provides a value for $m/r^4$, the field vector measurement provides a value for $m/r^3$, the range results from the ratio of the latter to the former). The uniqueness of the solution arises from the requirement that all three components of the vector magnetic field must be reproduced.

Subsequently, it was shown by a mathematically more explicit method that there were, in general, four solutions for bearing vector and scaled moment vector, and that these solutions were symmetrically arranged in the plane defined by the physical dipole position and moment vectors. (Frahm, "Inversion of the Magnetic Field Gradient Equations for a Magnetic Dipole Field", in *Naval Coastal Systems Laboratory Report NCSL* 135-72, Panama City, Fla., November 1972). Frahm's solution method is computationally more efficient than Wynn's, and was used in early U.S. Navy demonstrations of magnetic localization. (Wynn, et. Al., "Advanced Superconducting Gradiometer/Magnetometer Arrays and a Novel Signal Processing Technique", in *IEEE Transactions on Magnetics*, vol. MAG-11, no. 2, March 1975, pp. 701-707).

In practice, a moving vector magnetometer (one that measures all three components of the magnetic field) cannot be used to measure the magnetic field vector of weak sources in the presence of the much larger earth's magnetic field. This is because of the difficulty in holding the magnetometer steady enough to keep the measured changes due to rotation in the large earth's field from overshadowing the anomalous field changes caused by motion past a weak source. As a consequence, the complete unique solution for position vector and magnetic moment vector described by Wynn cannot be implemented with a moving vector magnetometer/tensor gradiometer combination sensor array, but instead is confined to applications where such a sensor array is stationary. If the total magnetic field is measured in coincidence with the gradient tensor, it is possible to determine the range to the source and the moment vector magnitude, but it is still necessary to deal with multiple solutions.

It is the object of this invention to use a moving tensor gradiometer alone to (1) measure the rate of change of the gradient tensor and use this information to affect an independent determination of the source bearing vector, magnetic moment vector direction and the ratio of the moment magnitude to the fifth power of the range to the source, and (2) use the result of (1), together with the existing inversion of the point-by-point gradient tensor information to uniquely determine, for each position of the tensor gradiometer, the position vector of the magnetic source relative to the tensor gradiometer, and the magnetic moment vector of the source.

SUMMARY OF THE INVENTION

The five independent analog output channels of a tensor magnetic gradiometer moving along a straight-line track are converted from analog to digital values, and several samples of each channel output are used to construct a polynomial fit to each gradient tensor component with the variable being either time or distance along track. The polynomial expressions are then used to calculate the rate of change of each independent gradient tensor component at the current sample, providing five numbers. The current samples of the independent gradient tensor components form a second set of five numbers. The five gradient tensor component rate samples are used in a new inversion process to produce solutions for the instantaneous bearing vector from the gradiometer to the source, the direction in space of the source magnetic moment vector, and the ratio of the magnetic moment vector magnitude to the fifth power of the range from gradiometer sensor to source. The new process produces from one to four solutions for the indicated source parameters, with an additional one to four solutions obtained by reflection of the bearing vector through an origin located at the gradiometer, with the associated moment vector directions remaining unchanged. The resulting solutions are then available for application to magnetic source localization using any method available for dealing with multiple solutions and satisfying the requirement for final scaling to get range and moment magnitude separately. The gradient tensor information is then independently processed using the established Frahm-Wynn inversion algorithm, to produce multiple solutions for the bearing vector, the direction of the magnetic moment vector, and the ratio of the moment vector magnitude to the fourth power of the range. The solution sets for the two inversion processes are then re-examined to find that unit bearing vector from each set that most closely matches one from the other with the associated unit moment vector from one set most closely matching that from the other, and there results a unique solution for the source position vector and magnetic moment vector for each successive location of the tensor gradiometer.

DESCRIPTION OF THE PREFERRED EMBODIMENT

Figure 1:
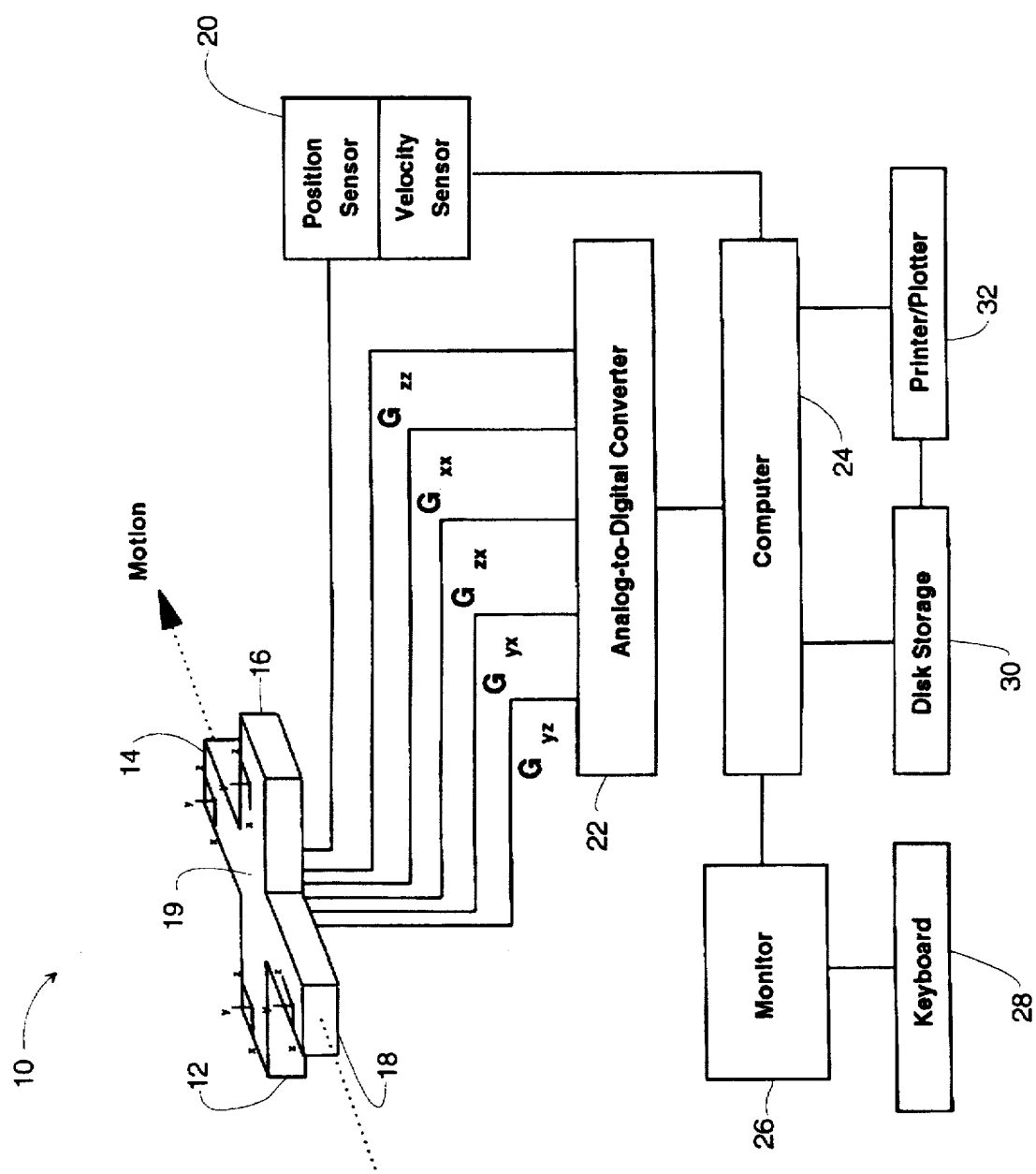
FIG. 1 is a simplified, functional, block diagram of an embodiment of the invention.

Referring now to FIG. 1, there is shown a simplified block diagram of an apparatus 10 constructed in accordance with the invention. Objects 12, 14, 16, and 18 are three-axis vector magnetometers placed on a substrate 19 which is in motion along the z-axis of the substrate. Objects 12 and 16 are arranged along the x-axis of the substrate, and objects 14 and 18 are arranged along the z-axis of the substrate. The y-axis of the substrate is vertically upward in the figure. The output of the z-axis of sensor 18 is electronically subtracted from the output of the z-axis of sensor 14, and the difference is divided by the separation distance between 14 and 18 to provide a sensible approximation of $G_{zz}$, the z-gradient of the z-magnetic field component at the center of the substrate. Likewise, similar differences and ratios are constructed for sensors 14 and 18 to provide sensible approximations to $G_{xz}$, and $G_{yz}$. Next, the output of the x-axis of sensor 16 is subtracted from the output of the x-axis of sensor 12 and the difference divided by the separation distance between sensors 12 and 16, providing a sensible approximation to $G_{xx}$, the x-gradient of the x-magnetic field component at the center of substrate 10. Likewise, a similar difference and ratio is constructed for sensors 12 and 16 to provide a sensible approximation to $G_{yx}$. An approximation can also be constructed for $G_{zx}$, but this is redundant information. Note that the above described embodiment of a device to measure five independent gradient tensor elements is not unique and is provided only for visualization and the algorithms to be described hereinafter are applicable regardless of the specific embodiment of the gradiometer.

The analog gradient signals are then passed to the 16-bit analog-to-digital converter 22. The sample rate is at least 8 hertz, and generally should be 4N hertz, where N-$\geq$2 is the number of samples for polynomial estimates of the gradients, discussed further hereinbelow. The analog signals are low-pass filtered at one-third or less of the sample frequency. The digitized gradients are passed to a personal computer 24 with a processor at least as fast as an Intel 486 DX2 processor running at 66 Mhz. In a preferred embodiment, the system software is numerically-compiled Rocky Mountain Basic. This system processes the invented algorithm at 4 hertz, which explains the factor of 4 in the general sample rate. A faster machine/software combination can accommodate a proportionately larger sample rate. Also entering the Computer 24 is either position or velocity information from either a position or velocity sensor 20. For localization of magnetic objects on a map, this device should provide positional information such as that produced by a differential GPS receiver, a laser range tracker, a string odometer, or at least a wheel-indexed analog-to-digital trigger signal which connects a given sample to the position of a sensor platform wheel along an established line. For localization of objects relative to the sensor only, it is sufficient to know the speed of the sensor, along the sensor z-axis, relative to the magnetic source and a velocity sensor will suffice. Also attached to the computer 24 is a keyboard 28 that is used to input parameters such as the choice of position or velocity sensor 20, the mode of final bearing vector solution construction in 91, the gradient tensor magnitude threshold value used in 45, the number of samples and polynomial degree to be used in 48 and 50, and the angular step size to be used in 55; a monitor 26 that is used to observe the magnitude of the gradient tensor, to provide real-time plots of magnetic source positional information determined by the invention, and to examine magnetic source strength information produced by the invention; a printer/plotter 32 to produce permanent records of magnetic source position information, and a storage disk 30 to store extended data sets for future or alternative processing.

Figure 2:
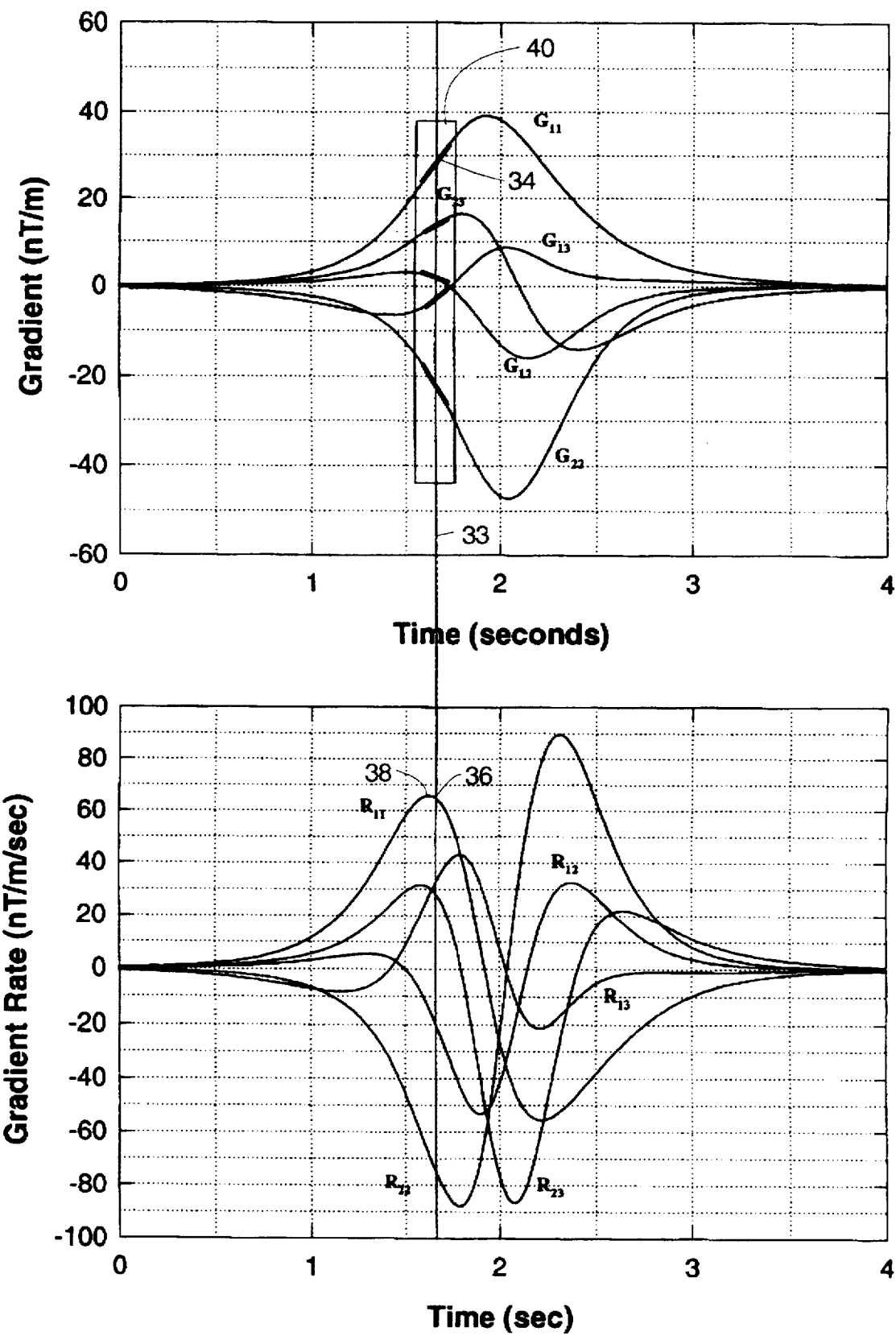
FIG. 2 is a time-history of the independent gradient tensor elements and associated gradient-rate tensor elements for a gradiometer translating past a magnetic source.

Referring now to FIG. 2, time traces of the five independent gradients and the five independent gradient rates for a sensor moving past a magnetic source are shown. By examining the gradient and gradient rate components at the time mark 33, the interpretation of the rates as the slopes of the gradient-time curves is clear. At 34, for example, the $G_{11}$ curve has a large positive slope, and at the corresponding point 36 on the $R_{11}$ curve, the time mark is near the positive peak 38 of the curve. Clearly, if the gradient-time curve is known, then the gradient rate-time curve can be deduced by selecting a few gradient values prior to the point of interest, performing a least-squares fit to a low-order polynomial, and then deducing the gradient rate at the point of interest. This process is illustrated by the highlighted sections in box 40. Explicit methods are described hereinafter.

Figure 3:
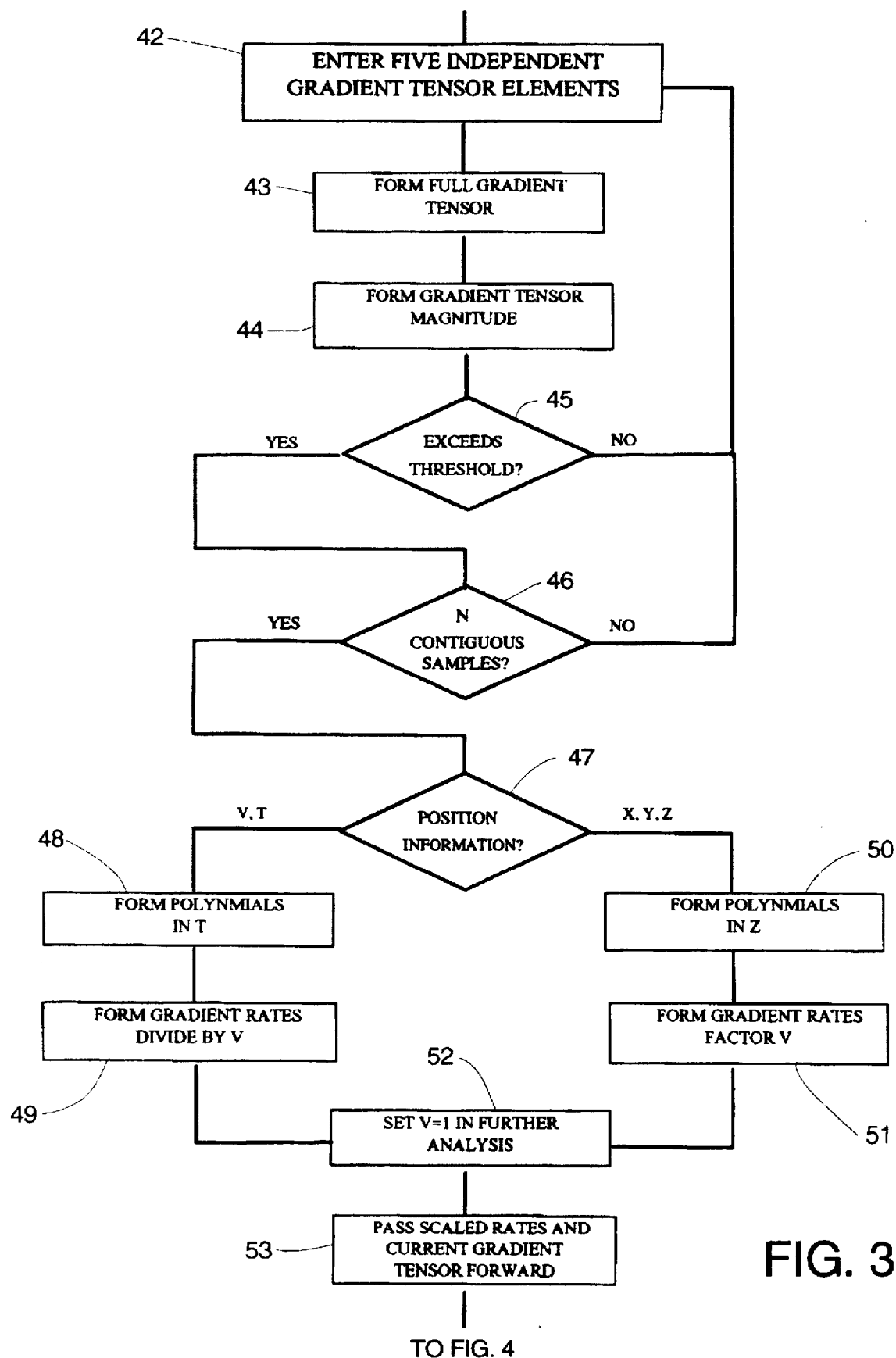
FIG. 3 is a simplified flow chart of a program utilized to select an acceptable set of sequential gradient tensor samples, and to estimate the current gradient rate tensor.
Figure 4:
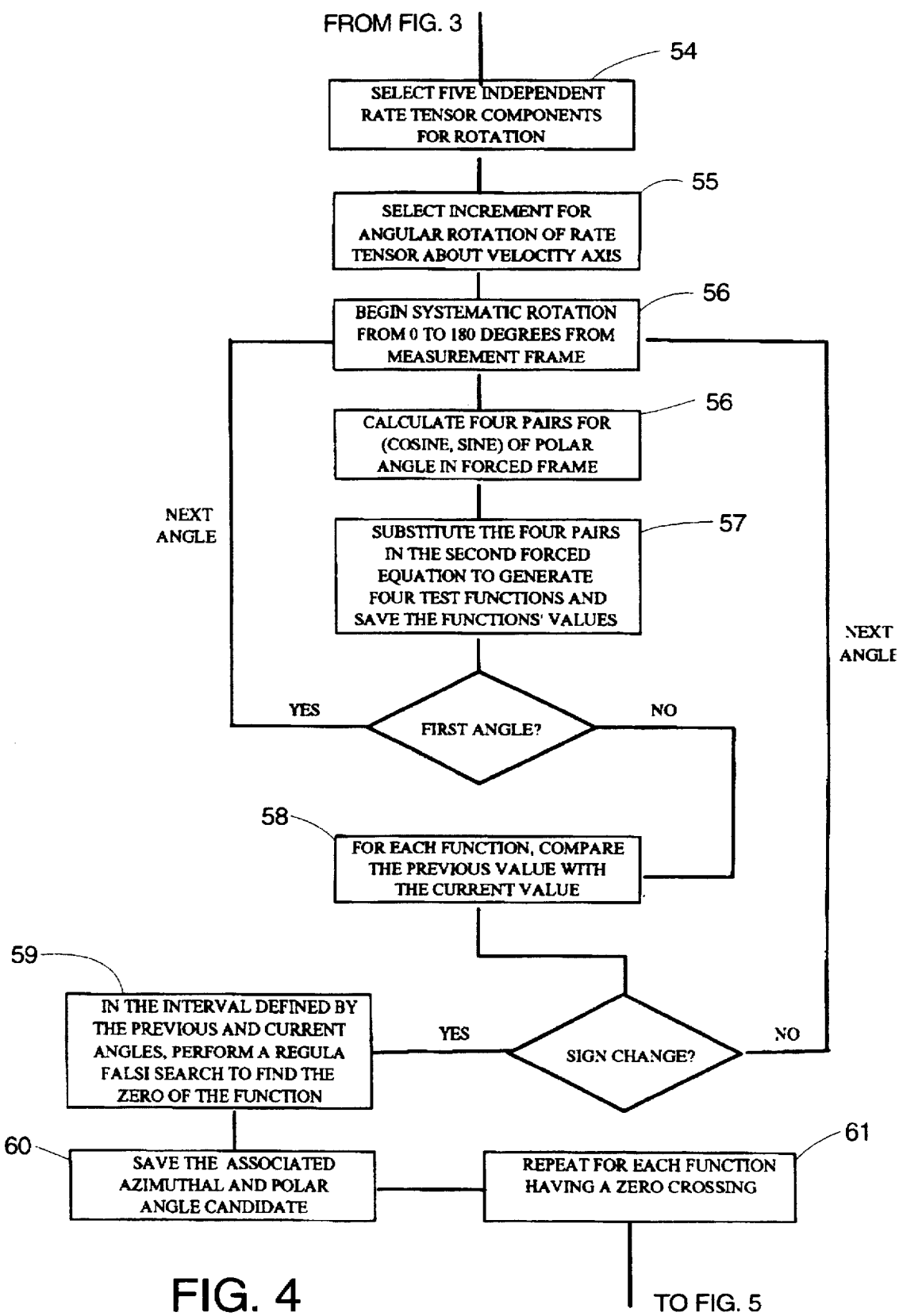
FIG. 4 is a simplified flow chart of a program utilized to systematically rotate the gradient rate tensor about the direction of motion, and find suitable candidates for the current azimuthal and polar angles of the source bearing vector.

Referring now to FIG. 3, five independent gradient components are selected (box 42). These are used to construct the full gradient tensor (box 43) using the relationships $$G_{yy} = -G_{xx} - G_{zz} \quad \text{(equation 1)}$$

$$G_{zy} = G_{yz} \quad \text{(equation 2)}$$

$$G_{xy} = G_{yx} \quad \text{(equation 3)}$$

$$G_{xz} = G_{zx} \quad \text{(equation 4)}$$

Then, the gradient tensor magnitude $G$ is computed (box 44) using the formula ($x \to 1, y \to 2, z \to 3$)

$$G = \sqrt{\sum_{i=1}^{3} \sum_{j=1}^{3} G_{ij} G_{ij}} \quad \text{(equation 5)}$$

and is tested to see if it exceeds a prescribed threshold value (logic switch 45). If the threshold is exceeded, a test is made for the prescribed number of samples N (logic switch 46), and if the required number of samples is present, the process moves on to position information logic switch 47.

It is an object of this invention to determine the rate of change of the gradient tensor components with respect to either time, or distance moved, as appropriate. If the position information is derived from speed and time, then the gradient rate components as functions of time are constructed by performing a standard least-squares fit of the N gradient component time samples to polynomials of degree $M \leq$ in t (box 48) according to the following equation $$G_{ij}(t) = a_{ij}^0 + a_{ij}^1 t + a_{ij}^2 t^2 + \ldots + a_{ij}^{M-1} t^{M-1} \quad \text{(equation 6)}$$

and then calculating the gradient rate components by taking the time rate of change of the polynomials (box 49) given by $$R_{ij} = a_{ij}^1 + 2a_{ij}^2 t + 3a_{ij}^3 t^2 + \ldots + (M-1)a_{ij}^{M-1} t^{M-2} \quad \text{(equation 7)}$$

If the position information is known directly, then the gradient components as functions of z are constructed as a standard least-squares fit of the N along-track samples to polynomials of degree $M \leq N$ in z, the along-track coordinate (box 50) according to the formula $$G_{ij}(z) = a_{ij}^0 + a_{ij}^1 z + a_{ij}^2 z^2 + \ldots + a_{ij}^{M-1} z^{M-1} \quad \text{(equation 8)}$$

The time derivative of $G_{ij}(z)$ is formally constructed using the chain rule $$R_{ij} = \frac{dG_{ij}(z)}{dt} = \frac{dG_{ij}(z)}{dz} \frac{dz}{dt} = \frac{dG_{ij}(z)}{dz} \dot{z} = \frac{dG_{ij}(z)}{dz} v \quad \text{(equaiton 9)}$$

yielding the equations for the rate tensor components $$\dot{z}(a_{ij}^1 + 2a_{ij}^2 z + 3a_{ij}^3 z^2 + \ldots + (M-1)a_{ij}^{M-1} z^{M-2}) = v P_{ij}(z). \quad \text{(equation 10)}$$

In the equations for the gradient rate components for a magnetic dipole source (equation 11), the speed v is a factor of the right-hand side of the equations. If the equations are divided through by v, then if the path to box 48 is chosen, the left hand side will be $R_{ij}/v$, with $R_{ij}$ and v both explicitly known. However, if the path to box 50 is chosen, v will cancel from both sides of the equations and $P_{ij}$, which is explicitly known, is used on the left-hand side. Then, regardless of which branch is taken to arrive at box 52, v is set equal to 1 in all further steps. The latest values of the gradient tensor components $G_{ij}$ are sent forward along with the current values of $R_{ij}$ and v, or $P_{ij}$ (box 53). It is emphasized in passing that the matrix of values for $R_{ij}$ and for $P_{ij}$ have the same characteristics as that for $G_{ij}$: namely, symmetry across the main diagonal, and a sum of diagonal values equal to zero. These properties are invoked without comment hereinafter.

The equations relating the gradient rate tensor with components $R_{ij}$ to the magnetic moment vector m with components ($m_1, m_2, m_3$) and position vector r with components ($r_1, r_2, r_3$) are given by $$R_{ij} = \frac{dG_{ij}}{dt} = \frac{dG_{ij}}{dz} \frac{dz}{dt} = \quad \text{(equation 11)}$$

$$\frac{105(m \cdot r)(v \cdot r) r_i r_j}{r^9} - \frac{15(m \cdot v) r_i r_j}{r^7} - \frac{15(m \cdot r) v_i r_j}{r^7} -$$

$$\frac{15(m \cdot r) v_j r_i}{r^7} - \frac{15(v \cdot r) m_i r_j}{r^7} - \frac{15(v \cdot r) m_j r_i}{r^7} -$$

$$\frac{15(m \cdot r)(v \cdot r) \delta_{ij}}{r^7} + \frac{3 m_i v_j}{r^5} + \frac{3 m_j v_i}{r^5} + \frac{3(m \cdot v) \delta_{ij}}{r^5}$$

With the introduction of the scaled moment vector S and bearing vector n given, respectively by $$S = \frac{3m}{r^5}, \quad n = \frac{r}{r} \quad \text{(equation 12)}$$

(equation 11) can be rewritten $$R_{ij} = \quad \text{(equation 13)}$$

$$35(S \cdot \hat{n})(v \cdot \hat{n})n_i n_j - 5(S \cdot v)n_i n_j - 5(S \cdot \hat{n})v_i n_j -$$

$$5(S \cdot \hat{n})v_j n_i - 5(v \cdot \hat{n})S_i n_j - 5(v \cdot \hat{n})S_j n_i -$$

$$5(S \cdot \hat{n})(v \cdot \hat{n})\delta_{ij} + S_i v_j + S_j v_i + (S \cdot v)\delta_{ij}$$

It is an object of this invention to invert (equation 13) in order to obtain the scaled moment vector S, and the bearing vector n in terms of the gradient rate tensor components $R_{ij}$. To this end, we first write (equation 13) in the form $$R_{ij} = \sum_{k=1}^{3} T_{ijk} S_k \quad \text{(equation 14)}$$

where the third-rank tensor $T_{ijk}$ is given by $$T_{ijk} = 35(v \cdot n)n_i n_j n_k - 5(v_i n_j + v_j n_i)n_k - 5n_i n_j v_k - 5(v \cdot n)(\delta_{ik} n_j + \delta_{jk} n_i) -$$
$$5(v \cdot n)\delta_{ij} n_k + (\delta_{ik} v_j + \delta_{jk} v_i) + \delta_{ij} v_k \quad \text{(equation 15)}$$

The first step in inverting the equations is to solve for the scaled moment vector in terms of the bearing vector and the rate tensor, and then substitute the result back into (equation 13). To accomplish this, a tensor $\tilde{T}_{ijk}$ inverse to $T_{ijk}$ is found satisfying the equation $$\sum_{i=1}^{3} \sum_{j=1}^{3} \tilde{T}_{ijk} T_{ijl} = \delta_{kl} \quad \text{(equation 16)}$$

This inverse tensor is given by $$\tilde{T}_{ijk} = \frac{v^2(v \cdot \hat{n})}{v^4 - (v \cdot \hat{n})^4} n_i n_j n_k - \quad \text{(equation 17)}$$

$$\frac{3(v \cdot \hat{n})^2 + 5v^2}{8[v^4 - (v \cdot \hat{n})^4]}(v_j n_i + v_i n_j)n_k +$$

$$\frac{1}{2[v^2 - (v \cdot \hat{n})^2]}[n_i n_j v_k - (v \cdot \hat{n})(\delta_{ik} n_j + \delta_{jk} n_i) +$$

$$\delta_{ik} v_j + \delta_{jk} v_i]$$

Now $\tilde{T}_{ijk}$ can be multiplied through (equation 14), the indices summed, and (equation 16) used, to solve for the scaled moment S giving $$S_k = \sum_{i=1}^{3} \sum_{j=1}^{3} \tilde{T}_{ijk} R_{ij} \quad \text{(equation 18)}$$

Then, (equation 18) is substituted into (equation 14) to yield $$R_{ij} = \sum_{k=1}^{3} \sum_{m=1}^{3} \sum_{n=1}^{3} T_{ijk} \tilde{T}_{mnk} R_{mn} \quad \text{(equation 19)}$$

which is a system of non-linear equations for the bearing vector components in terms of the measured rate tensor components. This system of equations is extremely complicated, and the method that we use to solve the equations is a principal achievement of this invention.

The method of solution of (equation 19) we call forced bounded search. In forced bounded search, the coordinate z-axis is chosen to cause an initial simplification of the equations. This is accomplished here by choosing the z-axis to be in the direction of sensor motion. In this reference frame v=(0,0,v). Next, we force the equations into the form that they would have in that reference frame, rotated about the z-axis, in which the bearing vector lies in the x-z plane. We don't know where this frame is beforehand, but we do know what (equation 19) would look like in this reference frame. In the forced frame, the five independent equations in (equation 19) simplify, with three of them assuming the common simple form $$(10w^4 - 5w^2 - 1)R_{11} + (5w^4 - 5w^2 - 4)R_{22} - 10uw^3 R_{13} = 0 \quad \text{(equation 20)}$$

while the other two equations simplify to the common form $$(5w^2 - 1)R_{12} - 5wuR_{23} = 0 \quad \text{(equation 21)}$$

where $$w = \cos\theta, \quad u = \sin\theta, \quad u^2 + w^2 = 1 \quad \text{(equation 22)}$$

and $\theta$ is the polar angle of the bearing vector.

Now note that with the constraint connecting u and w in (equation 22), (equation 20) and (equation 21) are redundant equations for w, and if either equation can explicitly be solved for w, substitution of the result into the other equation creates a consistency condition relating the independent gradient rates $R_{11}$, $R_{22}$, $R_{12}$, $R_{13}$, and $R_{23}$ that must be satisfied in the forced reference frame. This is the key to the solution of (equation 19) by forced bounded search.

The gradient rate tensor components are closed under rotations about the z-axis. This means that the measured rate components can be used to compute the components in a reference frame rotated about the z-axis by any prescribed angle. Thus, for a prescribed rotation angle, the rate tensor components can be substituted into the consistency condition described in the previous paragraph to see if the condition is satisfied. If the prescribed angle coincides with the azimuthal angle of the bearing vector as seen in the measurement frame, the condition must be satisfied.

We can convert (equation 21) to the form $$25(R_{12}^2 + R_{23}^2)u^4 - (40R_{12}^2 + 25R_{23}^2)u^2 + 16R_{12}^2 = 0 \quad \text{(equation 23)}$$

which has the two solutions (u=sin θ must be non-negative)

$$u = \sqrt{\frac{8R_{12}^2 + 5R_{23}^2 \pm \sqrt{R_{23}^2(16R_{12}^2 + 25R_{23}^2)}}{10(R_{12}^2 + R_{23}^2)}} \quad \text{(equation 24)}$$

The constraint (equation 22) gives, for each solution for u in (equation 24), two solutions for w given by $$w = \pm\sqrt{1 - u^2} \quad \text{(equation 25)}$$

Each of these four values for w, when substituted into (equation 20), provides a consistency test in that at least one of them must satisfy (equation 20) when the source bearing vector lies in the x-z plane of the coordinate system.

Now we describe the solution process in a systematic way. Selecting the five independent rate components for rotation (box 54), we select $A_0 = X_{11}$, $B_0 = X_{22}$, $C_0 = X_{12}$, $D_0 = X_{13}$, and $E_0 = X_{23}$ for the measured components, where $X_{ij}$ represents either $R_{ij}/v$ or $P_{ij}$, depending on the branch taken in FIG. 3. Then, an angular step size is selected (typically one degree, see box 55) and the rotation process 56 started with the current rotation angle denoted by ψ. The rotation equations apply equally well to $R_{ij}/v$ or $P_{ij}$, and in the following A, B, C, D, and E represent either choice, where the symbols without the 0 subscript denote values in the rotated reference frame. The equations are:

$$A = A_0 \cos^2 \psi + B_0 \sin^2 \psi + 2C_0 \sin \psi \cos \psi \qquad \text{(equation 26)}$$

$$B = A_0 \cos^2 \psi + B_0 \sin^2 \psi - 2C_0 \sin \psi \cos \psi \qquad \text{(equation 27)}$$

$$C = -(A_0 - B_0)\sin \psi \cos \psi + C_0(\cos^2 \psi - \sin^2 \psi) \qquad \text{(equation 28)}$$

$$D = D_0 \cos \psi + E_0 \sin \psi \qquad \text{(equation 29)}$$

$$E = -D_0 \sin \psi + E_0 \cos \psi. \qquad \text{(equation 30)}$$

Going now to box 57, four pairs of possible values for u=cos θ and w=sin θ are constructed, where θ is a possible value for the polar angle of the source as seen in the original measurement frame. The four pairs are generated from the rotated rate components according to:

$$u = \sqrt{\frac{8C^2 + 5E^2 \pm \sqrt{E^2(16C^2 + 25E^2)}}{10(C^2 + E^2)}} \qquad \text{(equation 31)}$$

and $$w = \pm \sqrt{1 - u^2}. \qquad \text{(equation 32)}$$

Each pair of values is then substituted into the expression (see box 58):

$$(10w^4 - 5w^2 - 1)A + (5w^4 - 5w^2 - 4)B - 10uw^3 D \qquad \text{(equation 33)}$$

and the resulting four function values are saved and to be used as reference values to be compared to the value of the four function after the next angular step. These function values are then compared to their values for the previous angular step to see if any of them have changed sign (see box 60). If none do, then the process goes to the next angular step and repeats (back to box 56). If a zero crossing is detected at box 61, then the interval between the last angular step and the present angular step is refined using a regula falsi procedure which includes (equation 25) through (equation 33) until the zero of the function is found (see box 62). At this point, the angular value for ψ locating the zero, denoted as ψ, and the associated values of u and w, denoted as U and W are saved (see box 63), and the remaining functions are examined (see box 64).

Figure 5:
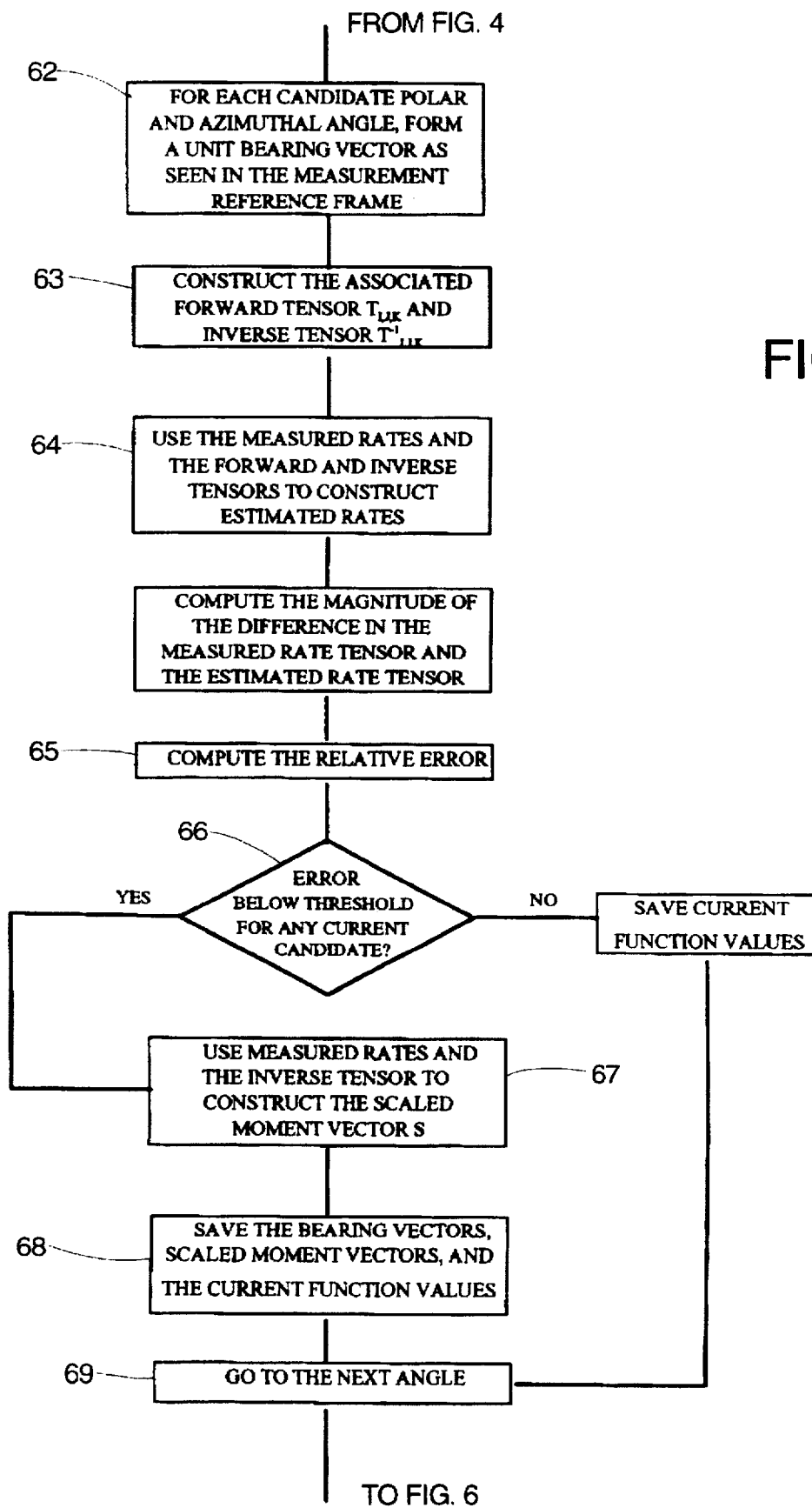
FIG. 5 is a simplified flow chart of a program utilized to construct special tensor values associated with the current bearing vector candidate, and then to determine if these current values do indeed reproduce the gradient rates currently measured, followed by construction of an associated scaled moment vector for bearing vector candidates found acceptable.

Referring now to FIG. 5, each of the candidate values for the azimuthal angle and polar angle of the source as seen in the measurement frame are used to construct a unit bearing vector (see box 65):

$$n = (n_1, n_2, n_3) = (W \cos \psi, W \sin \psi, U). \qquad \text{equation (34)}$$

The question now is whether the candidate bearing vector n is physical. To determine this, we must use it to construct estimates of the rate tensor components and determine if these estimates agree with the original measured values. If they do, then n is a physically acceptable solution for the bearing vector. To this end (see box 66) a third rank tensor $T_{ijk}$ and its inverse tensor $\tilde{T}_{ijk}$, are constructed. Using (equation 15) for $T_{ijk}$ and (equation 17) for $\tilde{T}_{ijk}$, where v now is a vector of unit magnitude in the direction of sensor motion (along the z-axis). The two tensors and the measured rates $X_{ij}$ are then used to make candidate estimated rates $\bar{X}_{ij}$. The prescription is (see box 67):

$$\bar{X}_{ij} = \sum_{k=1}^{3} \sum_{m=1}^{3} \sum_{n=1}^{3} T_{ijk} \tilde{T}_{mnk} X_{mn} \qquad \text{(equation 35)}$$

The magnitude of the difference in the measured rate tensor and the estimated rate tensor is calculated in box 68.

The error is determined by comparing the difference in the candidate rates and the measured rates to the measured rates in the least squares sense (see box 69) according to the formula:

$$\epsilon = \frac{\sqrt{\sum_{i=1}^{3}\sum_{j=1}^{3}(\bar{X}_{ij} - X_{ij})^2}}{\sqrt{\sum_{i=1}^{3}\sum_{j=1}^{3}X_{ij}^2}}. \qquad \text{(equation 36)}$$

Generally, ε is zero to machine roundoff accuracy for acceptable solutions, depending on the number of iterations in the regula falsi zero finding process. In a machine with double precision arithmetic a value for ε of $10^{-15}$ to $10^{-20}$ is suitable for 10 iterations (see logic switch 70).

If the error ε is acceptable for any zero crossing of any of the four functions, the next step is to construct the associated scaled moment vector S (see box 71), if not, the systematic rotation is continued (see box 73). The scaled moment vector is constructed using the prescription:

$$S_k = \frac{3m_k}{r^5} = \sum_{m=1}^{3} \sum_{n=1}^{3} \tilde{T}_{mnk} X_{mn} \qquad \text{(equation 37)}$$

where the vector m is the magnetic moment vector of the source, embodying the source magnetic strength, and magnetic alignment, and r is the range from sensor to source. The physically acceptable bearing vector n and scaled moment S are then saved pending completion of the rotation cycle (see box 72).

Figure 6:
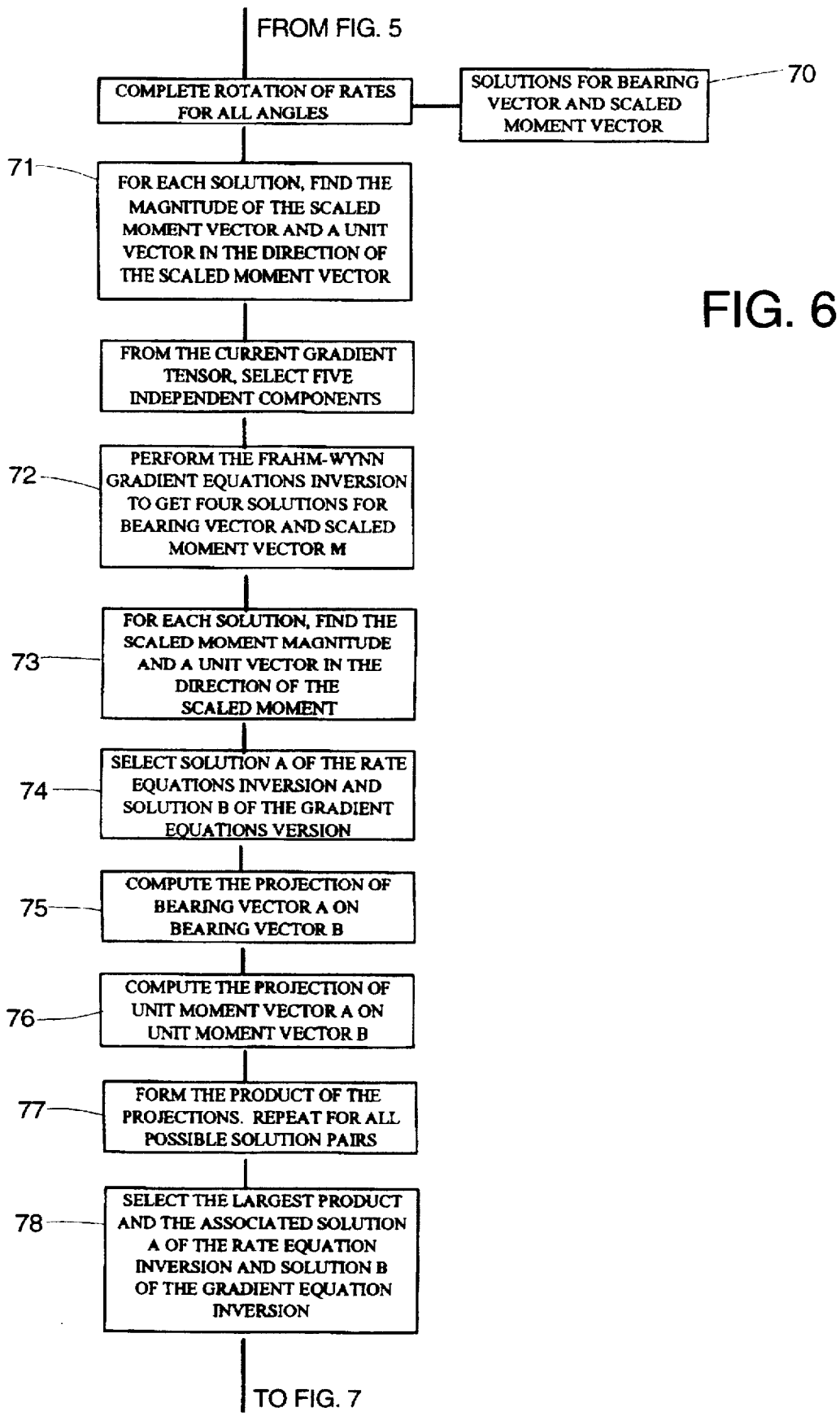
FIG. 6 is a simplified flow chart of a program utilized to collect together all current acceptable solutions to the gradient rate inversion procedure, calculate the current solutions to the gradient tensor equation (Frahm-Wynn algorithm), and pairwise examine the solutions, one from each algorithm, selecting that pair that most closely matches.

Referring now to FIG. 6, the systematic rotation of rate data is completed at box 74, and all physically acceptable solutions for bearing vector n to the source, and associated scaled moment vector S of the source are available for further analysis, providing a principal product of the invention (see box 75) These solutions will hereinafter be called the Wynn solutions to distinguish them from the Frahm-Wynn solutions to a different problem hereinbelow described. For each solution for bearing vector and scaled moment vector for a given measurement point, there is another solution obtained by reflecting the bearing vector through the measurement point and using the same scaled moment vector. This explains why the systematic rotation of the gradient rate tensor about the direction of motion only spans 180 degrees.

The previous process can be repeated up to this point, obtaining results for a new position of the gradient sensor. The process produces from one to four solutions in each 180 degree halfspace for bearing vector and scaled moment vector at a given measurement point, each solution capable of reproducing the measured gradient rate tensor. Of particular note is the fact that directional information has been obtained using only the rate of change of the gradient tensor, and this can be an advantage in circumstances wherein the gradient tensor components are contaminated by unknown constant or slowly-varying offset values.

The next purpose of the invention is to select a unique solution for the directional information relating to the magnetic source, as well as providing the actual range of the source relative to the sensor, and the actual magnetic moment magnitude (magnetic "strength") of the magnetic source. In preparation for this, the solutions to the previous process (the Wynn solutions) are prepared for further analysis by computing, for each solution, the magnitude of the scaled moment vector S, and a vector of unit magnitude s in the direction of the scaled moment vector S (see box 76) according to the prescription:

$$S = \sqrt{\sum_{k=1}^{3} S_k^2} \quad \text{(equation 38)}$$

$$s = \frac{S}{S}. \quad \text{(equation 39)}$$

This process is carried out for all Wynn solutions for a given measurement point.

Proceeding now to box 78, the current gradient tensor components are selected at box 77 and are employed, and they are used to produce four solutions for bearing vector n and scaled moment vector M where $$M = \frac{3m}{r^4} \quad \text{(equation 40)}$$

where, again, m is the magnetic moment vector embodying the magnetic strength and magnetic orientation of the magnetic source, and r is the range from sensor to source. The procedure for constructing these solutions is detailed elsewhere (Wynn, "Dipole Tracking with a Gradiometer", in *Naval Ship Research and Development Laboratory Report* NSRDL/UPC 3493, Panama City, Fla., January 1972 or Frahm, "Inversion of the Magnetic Field Gradient Equations for a Magnetic Dipole Field", in *Naval Coastal Systems Laboratory Report NCSL* 135-72, Panama City, Fla., November 1972). These solutions will be called the Frahm-Wynn solutions hereinafter.

The Frahm-Wynn solutions are prepared for further analysis by computing the scaled moment magnitude M and a vector of unit magnitude m according to the prescription (see box 79):

$$M = \sqrt{\sum_{k=1}^{3} M_k^2} \quad \text{(equation 41)}$$

$$m = \frac{M}{M}. \quad \text{(equation 42)}$$

Next, bearing vector solution $n_A$ and the associated unit moment vector $s_A$ are selected from the Wynn solutions, and bearing vector $l_B$ and the associated unit moment vector $m_B$ are selected from the Frahm-Wynn solutions (see box 80). The projection of one bearing vector on the other (see box 81) is computed:

$$p_{AB} = n_A \cdot l_B \quad \text{(equation 43)}$$

and then the projection of one unit moment vector on the other (see box 82) is computed:

$$q_{AB} = s_A \cdot m_B \quad \text{(equation 44)}$$

and the product of the two projections is computed for all possible pairs from the two sets of solutions (see box 83). Finally (see box 84), the largest of the products is selected, and the corresponding solution for bearing vector and scaled moment vector from each set is saved: n and S from the set of Wynn solutions and l and M from the Frahm-Wynn solutions.

Figure 7:
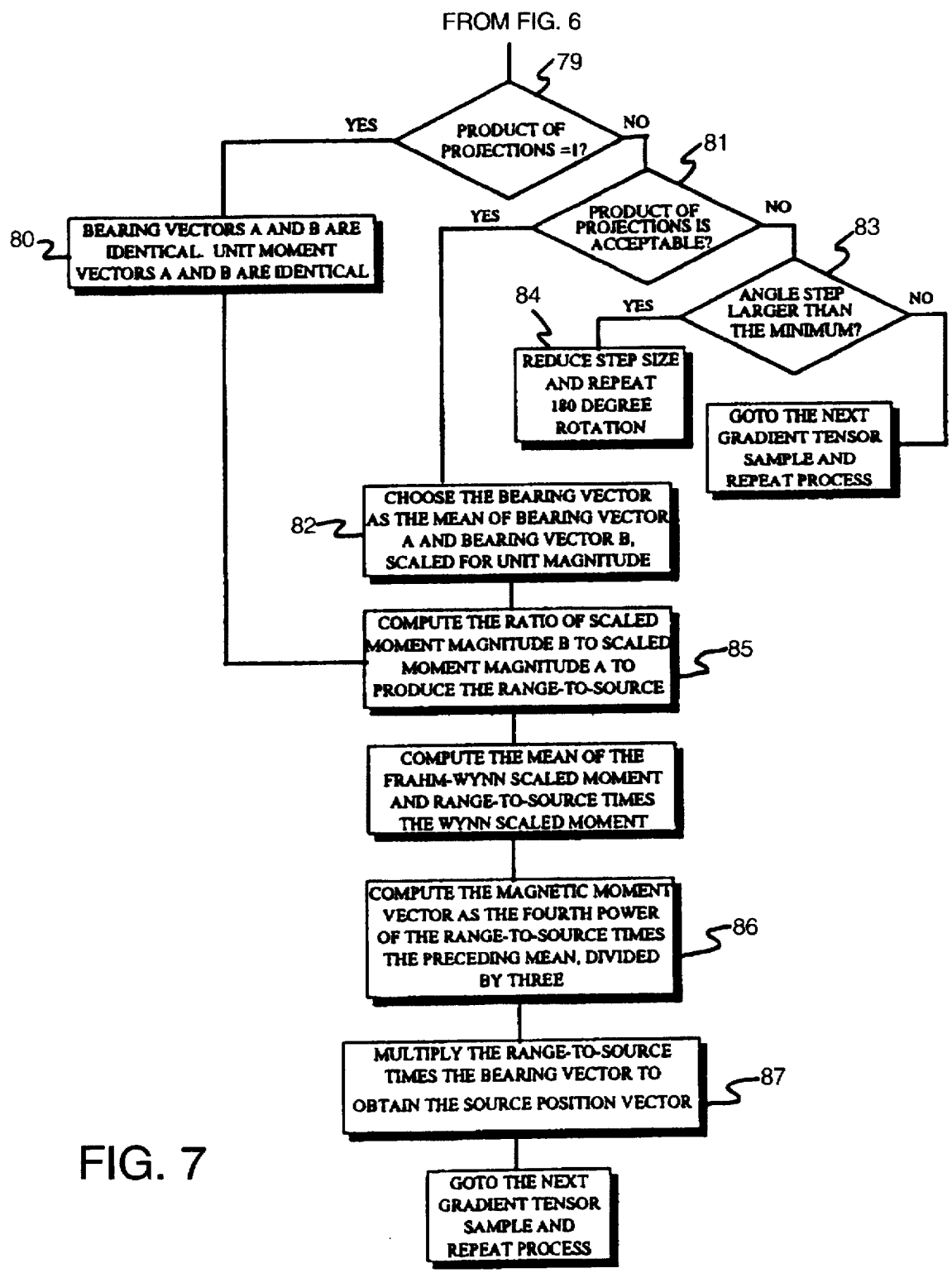
FIG. 7 is a simplified flow chart of a program utilized to determine whether the matched solutions are close enough, and to then either refine the angle search, or go on to a new data sample, or use the matched solutions to uniquely determine magnetic source position vector and magnetic moment vector.

Referring now to FIG. 7, the projection of the bearing vectors from the two sets of solutions one on the other are limited to values between −1 and 1, with a value of 1 implying that they are identical. A similar statement applies to the unit moment vectors from the two sets of solutions. When the maximum product of the two projections (from box 84) is 1, the two solutions are identical, and in the present process represent a unique solution for the bearing vector and unit moment vector for the magnetic source. This always occurs when the measured gradient tensor components arise from a pure magnetic dipole source and are free from noise contamination, corresponding to the yes branch from box 86 from logic branch 85.

In the presence of noise, the maximum product of projections may be less than 1, but still be sensibly near to 1. A value of 0.9, or even 0.8 would suggest that the two solutions are physically similar, and form a useful result. In this case, the yes branch of logic switch 87 would be selected, and a reasonable, unique value to use for the unit magnitude bearing vector to the magnetic source is (see box 91):

$$k = \frac{n + l}{|n + l|} \quad \text{(equation 45)}$$

where the vector has been normalized to insure unit magnitude, however, under certain noise condition, using n alone or l alone may give superior results.

If the maximum product of projections is too small to be useful, it may be that the angular step in the systematic rotation is too large, and at least one of the consistency functions had double zeros within one of the step intervals. This is very likely to be the case if the signal-to-noise ratio is large and a product of projections near 1 is not obtained. In this case the no branch of logic switch 87 is taken, and if the angular step size has not gone below a reasonable lower limit (logic switch 88), the systematic 180 degree rotation is repeated (see box 89). Otherwise the process starts over again with new data at a new measurement point (see box 90).

Continuing after box 91, the magnitude of the scaled moment from the Wynn solution, S, and the magnitude of the scaled moment from the Frahm-Wynn solution, M, are used to construct the range from sensor to source (see box 93) according to the prescription:

$$r = \frac{M}{S} \quad \text{(equation 46)}$$

The mean of the Frahm-Wynn scaled moment and range-to-source multiplied by the Wynn scaled moment are computed at box 93 and then (see box 94) the magnetic moment vector of the source is constructed from a weighted average of the scaled moment vectors M and S according to the prescription:

$$m = \frac{r^4}{3} \frac{(M + rS)}{2}. \quad \text{(equation 47)}$$

Finally (see box 95), the range to source r is multiplied onto the unit bearing vector k to produce the position vector r:

$$r = rk. \quad \text{(equation 48)}$$

The next gradient tensor sample is obtained and the process repeated at box 96. The above-mentioned apparatus has been used with simulated data from thousands of randomly selected magnetic dipole sources. In all cases, the Wynn solutions at each point number at least 1 and at most 4 in each 180 degree halfspace. When the Frahm-Wynn solutions are used jointly with the aforementioned Wynn solutions in the absence of noise, there invariably results the unique solution for magnetic source position and magnetic source moment vectors. When the simulated data is contaminated with real noise from a tensor gradiometer in motion, the Wynn solutions conjoined with Frahm-Wynn solutions produce unique, physically sensible solutions for source position vector and magnetic moment vector that well approximates those quantities for the actual source, when the signal-to-noise ratio is sensibly large.

While the invention has been illustrated with respect to specific hardware, it should be understood that alternative general or specific-purpose computing equipment or hardwired logic circuitry could be used in practicing the invention.

What I now claim as my invention is:

1. A method for analyzing the signals from a moving tensor magnetic gradiometer to determine the direction therefrom to a magnetic source, comprising the steps of:

converting a series of analog measurements from said moving tensor magnetic gradiometer to a corresponding series of digital values;

using said digital values to construct a complete gradient tensor matrix;

computing mathematical derivatives of said gradient tensor matrix to produce a gradient-rate tensor matrix;

inverting said gradient tensor matrix to produce a first plurality of vector values indicative of a bearing from said moving tensor magnetic radiometer to said magnetic source, wherein data indicative of range from said moving tensor magnetic gradiometer to said magnetic source is implicit in said first plurality of vector values;

inverting said gradient-rate tensor matrix based on a direction of motion of said moving tensor magnetic gradiometer to produce a second plurality of vector values indicative of a bearing from said moving tensor magnetic gradiometer to said magnetic source, wherein data indicative of range from said moving tensor magnetic gradiometer to said magnetic source is implicit in said second plurality of vector values; and correlating said first plurality of vector values with said second plurality of vector values, wherein a highest correlation therebetween identifies one vector value indicative of a bearing and range from said moving tensor magnetic gradiometer to said magnetic source.

2. A method for analyzing the signals from a moving tensor magnetic gradiometer to determine the direction from the gradiometer sensor to a magnetic source capable of producing the observed magnetic gradient rate tensor, the magnetic orientation of a source capable of producing the observed magnetic gradient rate tensor, and the ratio of the magnetic source strength to the fifth-power of the range from sensor to source for a magnetic source capable of producing the observed magnetic gradient rate tensor, comprising the steps of:

a. obtaining sensible approximations of the axis-gradients of the axis-magnetic field component at the center of a three-axis magnetometer and providing an analog signal output representing each such approximation;

b. Low-pass filtering said analog signals at one-third or less of the sampling frequency;

c. digitizing said analog approximations at a sampling rate of 4N hertz, where $N \geq 2$ is the number of samples for polynomial estimates of said gradients;

d. inputting said digitized gradient approximations, positional information from a position sensor, and inputs from a keyboard for inputting parameters to a computer including choice of position or velocity sensor, mode of final bearing vector choice, gradient tensor magnitude threshold, polynomial degree, and angular step size;

e. selecting five independent gradient components from said digitized inputs;

f. constructing a full gradient tensor from the x, y, and z axis gradient components using $G_{yy} = -G_{xx} - G_{zz}$; $G_{zy} = G_{yz}$; and $G_{xz} = G_{zx}$;

g. computing the gradient tensor magnitude h. testing the gradient tensor magnitude G to see if it exceeds a prescribed threshold value; if yes, continue; if no, return to step e, and again selecting five independent gradient components and proceeding through steps f and g;

i. testing the gradient tensor magnitude for the required number of samples N; if yes, continue;

j. constructing gradient rate components, where the position information is in terms of time and speed, by performing a least-squares fit of the N gradient component time samples to polynomials of degree $N \leq N$ in t according to $$G_{ij}(t) = a_{ij}^0 + a_{ij}^1 t + a_{ij}^2 t^2 + \ldots + a_{ij}^{M-1} t^{M-1}$$

and k. taking the time rate of change of said polynomials to estimate the gradient rate components in the form of:

$$R_{ij} = a_{ij}^1 + 2a_{ij}^2 t + 3a_{ij}^3 t^2 + \ldots + (M-1)a_{ij}^{M-1} t^{M-2}$$

or l. approximating the gradient components by a standard least-squares fit of the N along-track samples to polynomials of degree $M \leq N$ in z, the along track coordinate according to $$G_{ij}(z) = a_{ij}^0 + a_{ij}^1 z + a_{ij}^2 z^2 \ldots + a_{ij}^{M-1} z^{M-1}$$

m. taking the time derivative of the resulting $G_{ij}(z)$ polynomials to produce gradient rate components and applying the chain rule to produce the platform speed $v = \dot{z}$ as an explicit factor according to $$\dot{z}(a_{ij}^1 + 2a_{ij}^2 z + 3a_{ij}^3 z^2 + \ldots + (M-1)a_{ij}^{M-1} z^{M-2}) = v P_{ij}(z)$$

n. processing the gradient rate by dividing through by v to obtain $R_{ij}/v$, both explicitly known or $P_{ij}$ explicitly known;

o. setting v to 1 in all subsequent steps;

p. substituting the scaled moment vector $$S = \frac{3m}{r^5},$$

and the bearing vector n into $$R_{ij} = \frac{dG_{ij}}{dt} = \frac{dG_{ij}}{dz} \frac{dz}{dt} =$$

$$\frac{105(m \cdot r)(v \cdot r) r_i r_j}{r^9} - \frac{15(m \cdot v) r_i r_j}{r^7} - \frac{15(m \cdot r) v_i r_j}{r^7} -$$

$$\frac{15(m \cdot r) v_j r_i}{r^7} - \frac{15(v \cdot r) m_i r_j}{r^7} - \frac{15(v \cdot r) m_j r_i}{r^7} -$$

$$\frac{15(m \cdot r)(v \cdot r) \delta_{ij}}{r^7} + \frac{3 m_i v_j}{r^5} + \frac{3 m_j v_i}{r^5} + \frac{3(m \cdot v) \delta_{ij}}{r^5}$$

-continued to obtain $R_{ij} = 35(S \cdot \hat{n})(v \cdot \hat{n})n_i n_j - 5(S \cdot v)n_i n_j - 5(S \cdot \hat{n})v_i n_j -$ $5(S \cdot \hat{n})v_j n_i - 5(v \cdot \hat{n})S_i n_j - 5(v \cdot \hat{n})S_j n_i -$ $5(S \cdot \hat{n})(v \cdot \hat{n})\delta_{ij} + S_i v_j + S_j v_i + (S \cdot v)\delta_{ij}$ and q. inverting $R_{ij} = 35(S \cdot \hat{n})(v \cdot \hat{n})n_i n_j - 5(S \cdot v)n_i n_j - 5(S \cdot \hat{n})v_i n_j -$ $5(S \cdot \hat{n})v_j n_i - 5(v \cdot \hat{n})S_i n_j - 5(v \cdot \hat{n})S_j n_i -$ $5(S \cdot \hat{n})(v \cdot \hat{n})\delta_{ij} + S_i v_j + S_j v_i + (S \cdot v)\delta_{ij}$ and solving by forced bounded search to obtain the scaled moment vector S and the bearing vector n in terms of the gradient rate tensor components $R_{ij}$.

3. A method of determining a position of a magnetic source relative to a moving magnetic sensor, comprising the steps of:

approximating gradient tensor components based on measurements made by said moving magnetic sensor;

constructing a gradient tensor matrix using said gradient tensor components;

determining a rate of change for each of said gradient tensor components to generate a rate tensor matrix;

inverting said gradient tensor matrix to produce a first plurality of vector values indicative of a bearing from said moving magnetic sensor to said magnetic source, wherein data indicative of range from said moving magnetic sensor to said magnetic source is implicit in said first plurality of vector values;

inverting said rate tensor matrix to produce a second plurality of vector values indicative of a bearing from said moving magnetic sensor to said magnetic source, wherein data indicative of range from said moving magnetic sensor to said magnetic source is implicit in said second plurality of vector values; and correlating said first plurality of vector values with said second plurality of vector values, wherein a highest correlation therebetween identifies one vector value indicative of a bearing and range from said moving magnetic sensor to said magnetic source.

4. A method according to claim 3 further comprising the step of sampling, with respect to time, said gradient tensor components prior to said step of constructing.

5. A method according to claim 3 further comprising the step of sampling, with respect to position of said moving magnetic sensor, said gradient tensor components prior to said step of constructing.

* * * * *